United States Patent
Tholen et al.

(10) Patent No.: US 10,141,996 B2
(45) Date of Patent: Nov. 27, 2018

(54) COMMUNICATION SYSTEM WITH DISTRIBUTED RECEIVER ARCHITECTURE

(71) Applicant: DRONE RACING LEAGUE, INC., New York, NY (US)

(72) Inventors: Lucas J. Tholen, North Mankato, MN (US); David A. Mitchell, Waterville, MN (US); Trevor Smith, New York, NY (US); Ryan Gury, Larchmont, NY (US); Nicholas Horbaczewski, New York, NY (US)

(73) Assignee: DRONE RACING LEAGUE, INC., New York, NY (US)

( * ) Notice: Subject to any disclaimer, the term of this patent is extended or adjusted under 35 U.S.C. 154(b) by 121 days.

(21) Appl. No.: 15/066,884

(22) Filed: Mar. 10, 2016

(65) Prior Publication Data

US 2017/0244457 A1  Aug. 24, 2017

Related U.S. Application Data

(60) Provisional application No. 62/266,662, filed on Dec. 13, 2015.

(51) Int. Cl.
*H04B 7/02* (2018.01)
*H04B 7/06* (2006.01)
*H04B 7/08* (2006.01)

(52) U.S. Cl.
CPC ............ *H04B 7/0615* (2013.01); *H04B 7/08* (2013.01); *H04B 7/0837* (2013.01)

(58) Field of Classification Search
CPC ............... H04W 24/02; H04W 52/245; H04W 52/346; H04W 52/241; H04B 10/25753; H04B 7/04; H04B 7/0608; H04B 7/0802; H04B 7/0805; H04B 7/0628; H04B 7/0689; H04B 7/0697
See application file for complete search history.

(56) References Cited

U.S. PATENT DOCUMENTS

| | | |
|---|---|---|
| 4,916,460 A | 4/1990 | Powell |
| 5,240,207 A | 8/1993 | Eiband |
| (Continued) | | |

OTHER PUBLICATIONS

"Is U.S. Drone Racing Legal," IEEE Spectrum, Nov. 2015.
(Continued)

*Primary Examiner* — Rahel Guarino
(74) *Attorney, Agent, or Firm* — Vierra Magen Marcus LLP

(57) ABSTRACT

A communication system is used to receive information from mobile sources. The system includes a plurality of antennas including multiple disjoint sets of multiple antennas configured to receive signals from the multiple mobile sources. At least a subset of the antennas have coverage areas that overlap with antennas in another set of the multiple disjoint sets of multiple antennas. The communication system also includes multiple receivers and multiple signal paths including one signal path for each set of multiple antennas. Each signal path is configured to provide outputs from a corresponding set of multiple antennas of the multiple disjoint sets of antennas to each of the multiple receivers. Each of the receivers choose to output information from one or more of the signal paths based on one or more characteristics of the signals received from the signal paths.

19 Claims, 5 Drawing Sheets

(56) References Cited

U.S. PATENT DOCUMENTS

| | | | |
|---|---|---|---|
| 5,479,397 A | 12/1995 | Lee | |
| 6,308,085 B1* | 10/2001 | Shoki | H04B 7/024 |
| | | | 455/273 |
| 7,082,320 B2 | 7/2006 | Kattukaran | |
| 7,313,415 B2 | 12/2007 | Wake | |
| 2010/0260103 A1 | 10/2010 | Guey | |
| 2011/0049290 A1 | 3/2011 | Seydoux | |
| 2011/0103495 A1* | 5/2011 | Hall | H04B 7/022 |
| | | | 375/260 |

OTHER PUBLICATIONS

PCT International Search Report dated Nov. 3, 2017, PCT Patent Application No. PCT/US2016/066310.

Written Opinion of the International Searching Authority dated Nov. 3, 2017, PCT Patent Application No. PCT/US2016/066310.

* cited by examiner

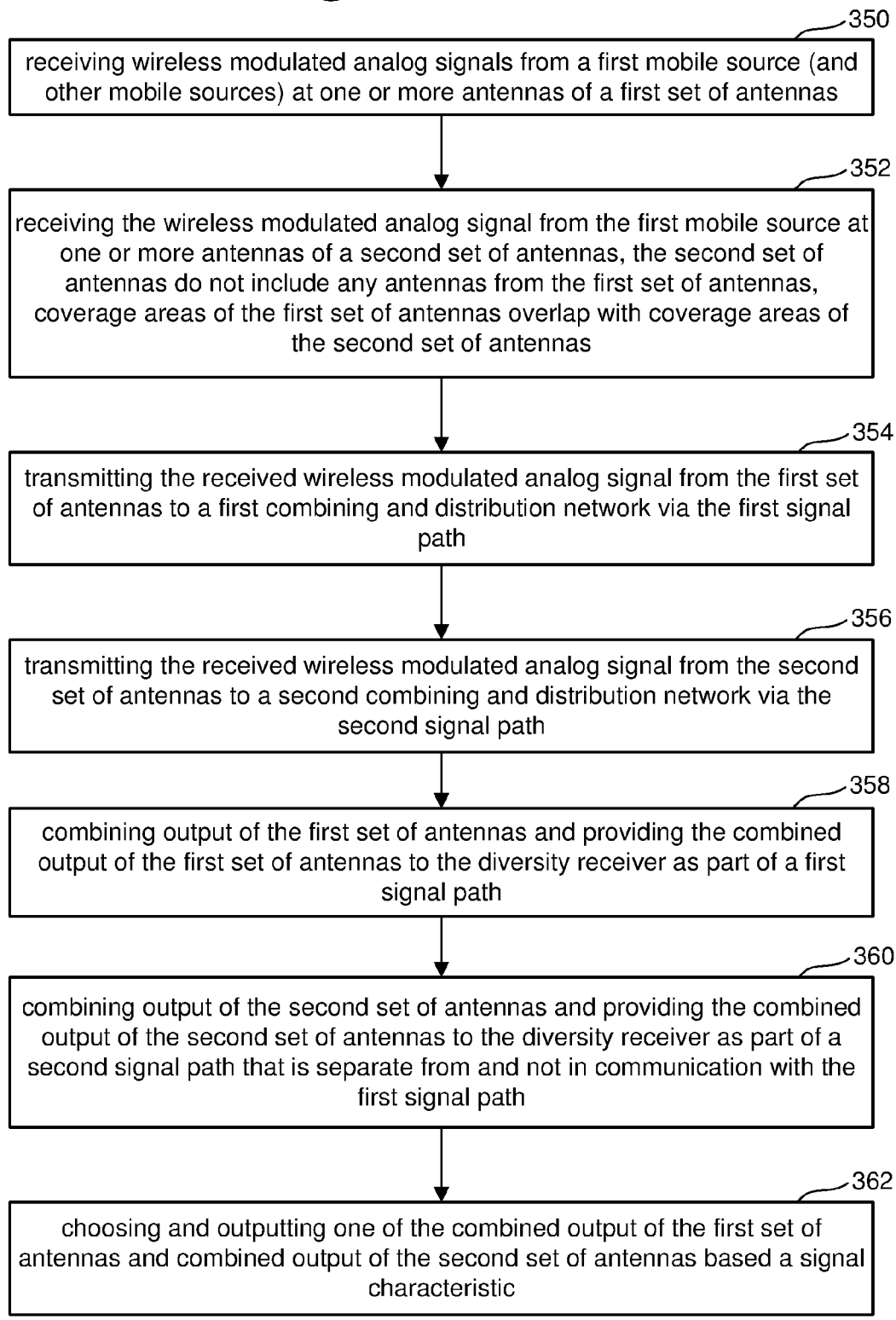

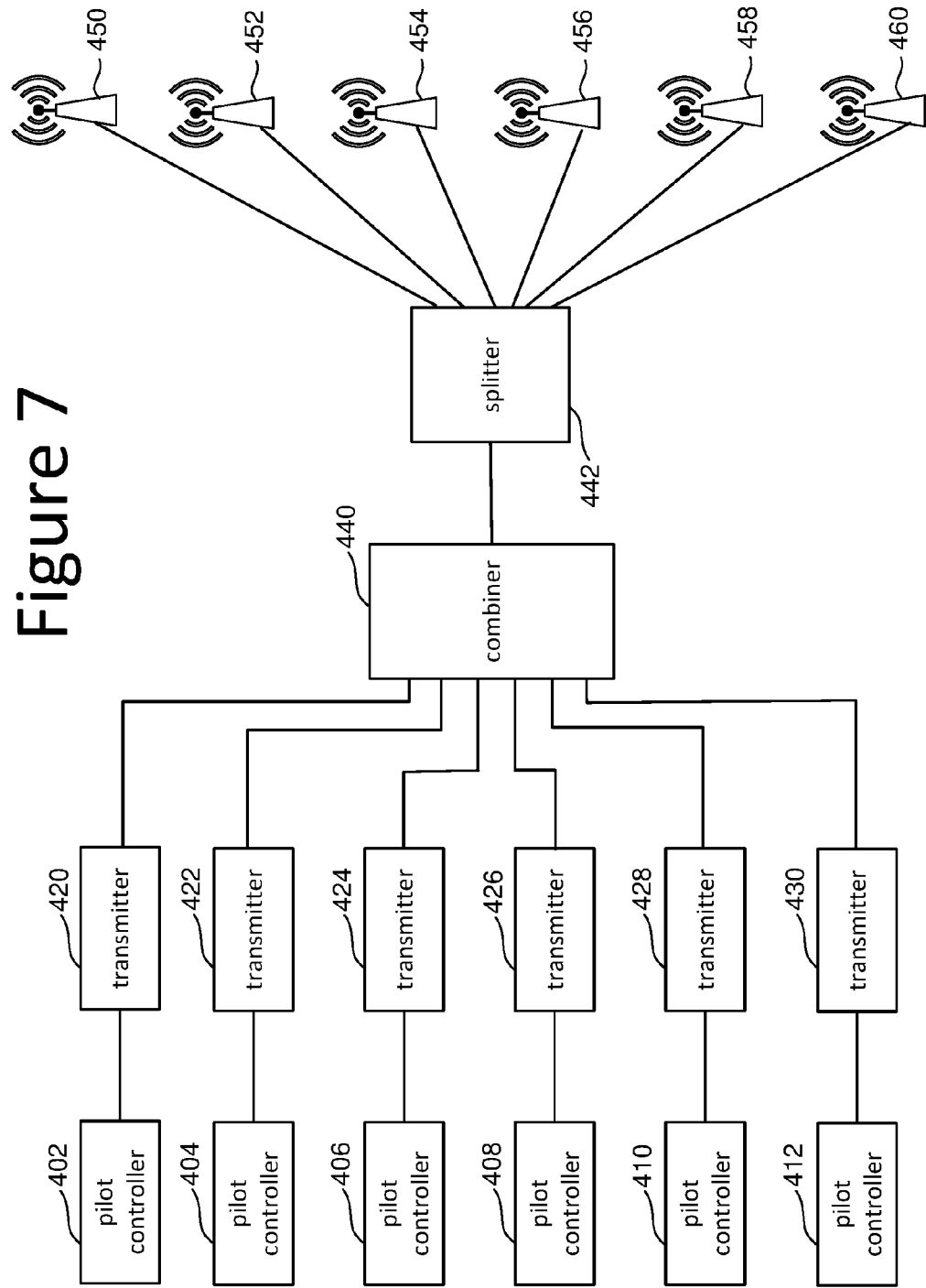

COMMUNICATION SYSTEM WITH DISTRIBUTED RECEIVER ARCHITECTURE

This application claims the benefit of U.S. Provisional Application 62/266,662 filed on Dec. 13, 2015.

BACKGROUND

The technology described herein relates to a wireless communications system that can be used for racing high speed radio controlled unmanned aircraft (i.e. drones) with low latency video transmission and flight control, as well as for other environments involving wireless communication with other types of mobile devices.

Currently, existing wireless systems are limited in overall range. For example, it may be difficult to stay in communication with multiple mobile devices (such as aircraft) over a large area with obstacles that prevent line of sight.

Existing systems are also limited in the total number of active users occupying the same coverage area. This limitation is a result of standard design practices which call for a lower Intermodulation Distortion specification for economic and power consumption purposes.

Some existing wireless video solutions FM modulate an NTSC signal with separate carriers for video, left audio, and right audio, which result in a multicarrier FM signal being transmitted. Due to nonlinearities in the active stages of both the transmitter and receiver circuits, spurious signals are generated outside the original signal bandwidth resulting in noise being generated in adjacent channels. This noise results in a further limitation in the number of active users in a given radio range.

Existing hardware used for the flight control communications are also limited in range due to the use of unlicensed spectrum and the rules that govern them.

SUMMARY OF THE DRAWINGS

FIG. 6 is a flow chart describing one embodiment of a processor for operating the distributed antenna system of FIG. 1.

FIG. 7 is a block diagram of a system for providing control signals to mobile devices, such as an unmanned aircraft in a race.

DETAILED DESCRIPTION

Figure 1:
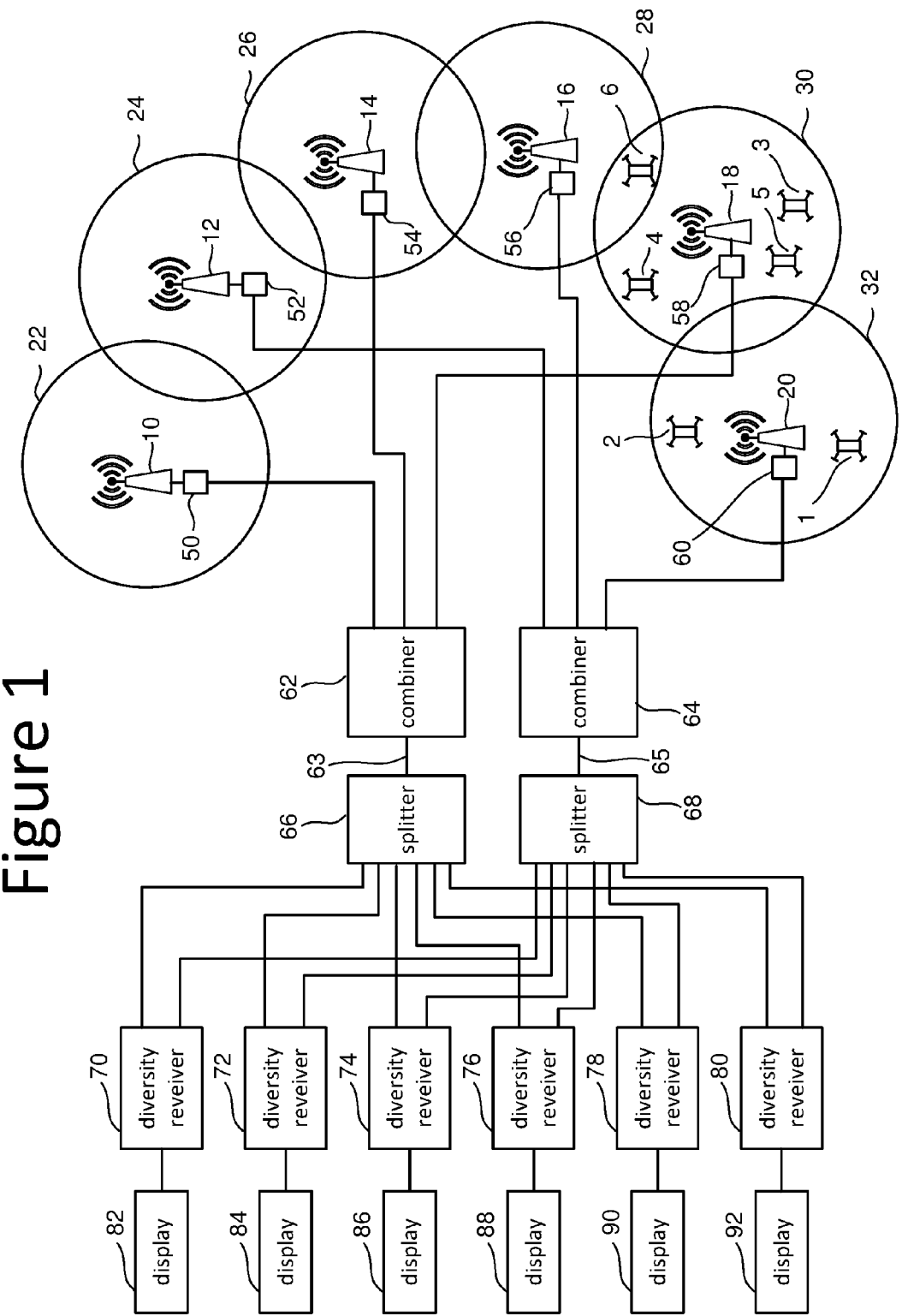
FIG. 1 is a block diagram of one embodiment of a distributed antenna system implementing a distributed receiver architecture.

A communication system is proposed to communicate with multiple mobile sources. For example, a distributed antenna system implementing a distributed receiver architecture can be used to receive live video from a set of unmanned aircraft. The system includes a plurality of antennas including multiple disjoint sets of multiple antennas configured to receive signals from the multiple mobile sources. At least a subset of the antennas have coverage areas that are adjacent (any maybe overlap) with coverage areas of antennas in another set of the multiple disjoint sets of multiple antennas. The communication system also includes multiple receivers and multiple signal paths including (in one embodiment) one signal path for each set of multiple antennas. Each signal path is configured to provide outputs from a corresponding set of multiple antennas of the multiple disjoint sets of antennas to each of the multiple receivers. Each of the receivers choose to output information from one or more of the signal paths based on one or more characteristics of the signals received from the signal paths.

One example implementation of the technology described herein includes a drone racing system comprising a plurality of drones, the distributed antenna system, a plurality of remote controllers that participate in unidirectional or bidirectional communication with the drones using analog communication in order to fly the drones such that each controller communicates with only one drone (or multiple drones); and a plurality of head mounted displays (or other types of displays) providing a first person view (FPV) that receive video from the drones via the distributed antenna system using analog communication such that each head mounted display receives video from one drone (or multiple drones). The controllers each include processors, memory, displays, input devices (buttons, dials, joysticks, knobs, etc), speakers, etc. and are used to remotely pilot the drones. The head mounted displays provide a virtual reality experience so that the pilot wearing the display, but remote from the drone, sees what a pilot in the drone would see via standard or high definition video. The drones can be any type of unmanned aircraft including airplanes, helicopters, other aircraft with multiple propellers (e.g., 4 propellers) or any type of drone design. In some embodiments, the drones will include one or more antennas for wireless communication with the distributed antenna system and other antennas systems to receive instructions for flight control from the remote controllers, to provide telemetry and other flight data to the remote controllers and to provide video for delivery of video from the drones to the head mounted displays.

In one example implementation, 4-6 drones can race on a course that is indoors and/or outdoors and includes multiple types of terrain and obstacles. In many cases the pilots using the remotes controllers will not have line of sight to the drones during an entire race and will rely on the video received from the drones. The pilots use the remote controllers and the head mounted displays to fly the drones. Because the drones will fly fast and it is a race, the communication of video and commands must be low latency. If the drone is slow to respond to a flight command or a pilot is slow to react to an obstacle in the drone's path, the drone may crash.

FIG. 1 is a block diagram of one embodiment of a distributed antenna system implementing a distributed receiver architecture that can be used as part of a drone racing system. Although the discussion below describes the system of FIG. 1 with respect to drones, the system of FIG. 1 and the technology described herein can be used with other mobile sources (e.g., automobiles, computing devices, manned aircraft, spacecraft, etc.) Six drones 1, 2, 3, 4, 5 and 6 are depicted in FIG. 1. More or less than six drones can be used. Each drone 1, 2, 3, 4, 5, 6 contains a video camera (e.g., NTSC or any other video format) which provides a first person view of the racing event. The NTSC signal generated by the camera is frequency modulated onto a carrier frequency and transmitted from the drone to the distributed antenna system. In this example, the 5.8 GHz frequency band is used as it is a popular unlicensed band worldwide. Each drone's carrier frequency is set to a unique channel within the 5.8 GHz frequency band to avoid interference, and the channels are allocated to provide both separation from other channels and to avoid creating in-band intermodulation distortion products. Intermodulation products are inevitably created regardless of frequency selection; however by using the proper frequency selection the desired signals can be allocated where we want in the spectrum to avoid on-channel collisions with intermodulation products.

FIG. 1 shows six antennas 10, 12, 14, 16, 18 and 20. More or less than six antennas can be used. Each antenna is associated with a coverage area from within which the antenna can reliably communicate with a drone (or other mobile source). For example, antenna 10 is in and corresponds to coverage area 22, antenna 12 is in and corresponds to coverage area 24, antenna 14 is in and corresponds to coverage area 26, antenna 16 is in and corresponds to coverage area 28, antenna 18 is in and corresponds to coverage area 30, and antenna 20 is in and corresponds to coverage area 32. In one embodiment, the coverage areas overlap; for example, drone 6 is depicted to be in the overlap between coverage areas 28 and 30.

If a drone 1, 2, 3, 4, 5, 6 is within a coverage area 22, 24, 26, 28, 30, 32, the signal is received using an antenna 10, 12, 14, 16, 18, 20, where it is amplified by a remote receiver front end module. For example, remote receiver front end module 50 is connected to antenna 10, remote receiver front end module 52 is connected to antenna 12, remote receiver front end module 54 is connected to antenna 14, remote receiver front end module 56 is connected to antenna 16, remote receiver front end module 58 is connected to antenna 18, and remote receiver front end module 60 is connected to antenna 20.

After being amplified by the corresponding remote receiver front end module, the amplified signal is carried across a transport medium, such as coaxial cable or fiber optic cable, to a combining and distribution network which connects the multiple antennas 10, 12, 14, 16, 18, 20, to multiple receivers 70, 72, 74, 76, 78, 80. In one embodiment, a first combining and distribution network comprises combiner 62 and splitter 66, and a second combining and distribution network comprises combiner 64 and splitter 68. Combiner 62 receives and combines the signals from antenna 10 (via remote receiver front end module 50), antenna 14 (via remote receiver front end module 54), and antenna 18 (via remote receiver front end module 58) to create a first combined signal 63. The first combined signal 63 is provided to the input of splitter 66, which create six copies of the first combined signal and transmits each copy to a different one of the six diversity receivers 70, 72, 74, 76, 78, 80. Combiner 64 receives and combines the signals from antenna 12 (via remote receiver front end module 52), antenna 16 (via remote receiver front end module 56), and antenna 20 (via remote receiver front end module 60) to create a second combined signal 65. The second combined signal 65 is provided to the input of splitter 68, which create six copies of the second combined signal and transmits each copy to a different one of the six diversity receivers 70, 72, 74, 76, 78, 80. Therefore, each of the diversity receivers 70, 72, 74, 76, 78, 80 receives at least two signals: (1) a signal from splitter 66 and (2) a signal from splitter 68. Thus, each receiver potentially can receive a signal from each antenna.

In one embodiment, each diversity receiver 70, 72, 74, 76, 78, 80 is associated with one drone 1, 2, 3, 4, 5, 6 so that each diversity receiver 70, 72, 74, 76, 78, 80 filters the received signals to identify the signals from the associated one drone. For example, the diversity receivers may include band pass filters that remove signals on carriers other than the carrier used for the associated drone. So if diversity receiver 70 is associated with drone 1, then diversity receiver 70 will filter out the signals from drones 2-6 from both signals at its input. The diversity receivers are tuned to the frequency of the corresponding drone which is how they are associated. After filtering, each diversity receiver chooses one of the two filtered input signals based on signal characteristics (discussed below). The receiver then demodulates the frequency modulated carrier of the chosen signals (for the associated drone) to create an NTSC signal (or other format). In another embodiment, the diversity receiver may demodulate both signals, but discard the signal that was not chosen.

The chosen NTSC signal is provided on the diversity receiver's output to a connected display device. For example, diversity receiver 70 is connected to display 82, diversity receiver 72 is connected to display 84, diversity receiver 74 is connected to display 86, diversity receiver 76 is connected to display 88, diversity receiver 78 is connected to display 90, and diversity receiver 80 is connected to display 92. The displays can be head mounted displays for first person viewing, computer monitors, televisions, etc. In some cases, more than one display can receive the output of a diversity receiver. Additionally, the output of one or more diversity receivers can be broadcast via one or more television signals. In one embodiment, there is one diversity receiver and one display for each drone. In other embodiments, there can be more than one diversity receiver and/or more than one display for each drone. In some embodiments, some drones will not be associated with a diversity receiver and/or display. In one embodiment, each diversity receiver receives video from each drone and outputs only one (or all or a subset) to a display. In another embodiment, each receiver only receives one video signal. In another embodiment, each receiver receives video from each drone and outputs all videos to each user.

In one embodiment, the system uses multiple separate signal paths so that the coverage areas 22, 24, 26, 28, 30, 32, if adjacent (and maybe overlapping), are kept isolated and on separate signal paths to the diversity receivers. In this embodiment, the antennas 10, 12, 14, 16, 18, 20 are grouped into multiple disjoint sets of multiple antennas each configured to receive signals from multiple mobile sources such as multiple drones. For example, antennas 10, 14 and 18 are in a first group of multiple antennas and antennas 12, 16 and 20 are in a second group of multiple antennas. The coverage areas of the antennas in the first group are adjacent and overlapping with the coverage areas of the antennas in the second group. Adjacent antennas are in different disjoint sets of antennas. For example, antenna 12 is adjacent to antennas 10 and 14, thus, antenna 12 is in a different set than antennas 10 and 14. Similarly, the coverage area 24 for antennas 12 is adjacent and overlapping coverage areas 22 and 26 for antennas 10 and 14. This way, signals received at adjacent antennas will be kept isolated. The signals from the first group of multiple antennas 10, 14 and 18 are transmitted to the diversity receivers 70-80 via a first signal path that includes the remote receiver front end modules, transmission line, combiner 62 and splitter 66. The signals from the second group of multiple antennas 12, 16 and 20 are transmitted to the diversity receivers 70-80 via a second signal path that includes remote receiver front end modules, transmission line, combiner 64 and splitter 68. The location of coverage areas are selected such that non-adjacent radio areas may be combined into a single diversity path, thereby reducing the total number of required diversity paths.

In one embodiment, each diversity receiver will receive one combined signal from each signal path. Because the system of FIG. 1 includes two signal paths, each diversity receiver will receive two combined signals, one from each of the two signal paths. That is, there is one signal path for each set of antennas. In some implementations, the antennas and their associated coverage areas can be grouped into more than two disjoint sets of multiple antennas; therefore, there will be more than two signals paths. If the antennas are grouped into N disjoint sets of multiple antennas, then there will be N signals paths and each diversity receiver will receive N inputs.

In one embodiment, the transmission lines from the remote receiver front end modules 50, 52, 54, 56, 58, 60 to combiners 62 and 64 is coaxial cable. In another embodiment, those transmission lines are fiber optic cables with RF over fiber transmit modules located at remote receiver front end modules 50, 52, 54, 56, 58, 60 and RF over fiber receive modules located at combiners 62 and 64. Replacing the coaxial cable with low loss fiber allows for a much longer cable run and thus a larger NLOS coverage area. A combination of coaxial cables and fiber optic cables is another possible implementation. Other transmission mediums can also be used.

Figure 2:
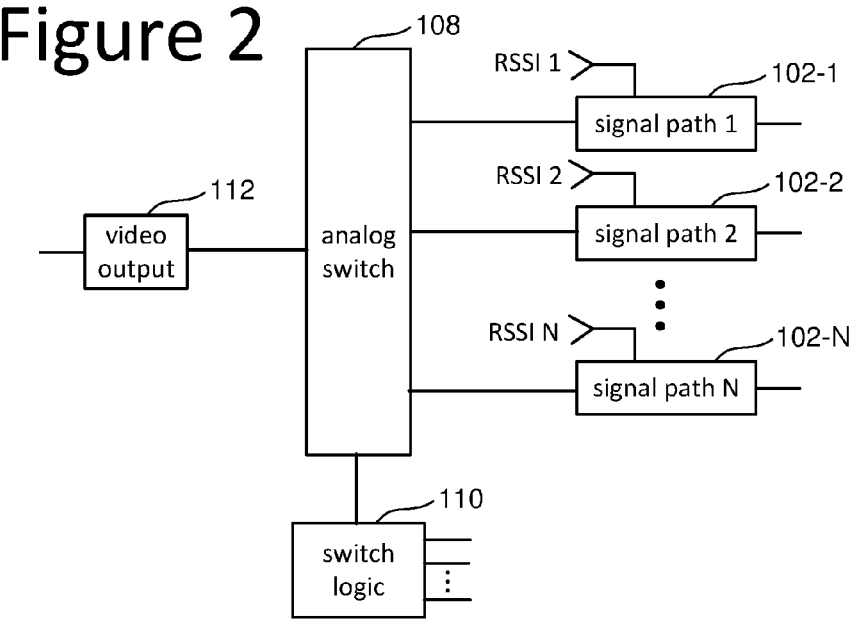
FIG. 2 is a block diagram of one example of a diversity receiver.

FIG. 2 is a block diagram of one embodiment of a diversity receiver 70, 72, 74, 76, 78 and 80, which can be implemented as one or more electrical circuits. Diversity is achieved by implementing two or more separate (i.e. not in communication) signal paths. One or more of the signal paths are chosen based on one or more signal characteristics, such as a Received Signal Strength Indicator (RSSI), link quality, clarity of video, position of an item in the video or position of the drone. FIG. 2 shows N signal path input interfaces 102-1, 102-2, . . . 102-N, each of which includes filters to remove the signals from all drones (or other types of sources) except one. In some embodiments, signals from more than one drone/source can be maintained. In one example implementation, each diversity receiver 70, 72, 74, 76, 78, 80 filters to obtain signals from a different drone. Additionally, signal path input interfaces 102-1, 102-2, . . . 102-N includes circuits to determine RSSI or other metrics (see above) indicative of signal characteristics. Each of the signals output from signal path input interfaces 102-1, 102-2, . . . 102-N, which are signals from the same drone/source but from different signal paths, are provided to a N:1 analog switch 108, where N is the number of unique signal paths. The extracted signal characteristics are provided to switch logic 110 for choosing one (or more than one) signal. In the example of FIG. 2, RSSI is determined for each of the signal paths to determine which path has the strongest signal. This process results in the strongest received signal being routed to the video output 112, with all other signals being isolated. In another embodiment, multiple videos can be combined into a single higher quality (or same quality) video. In one example implementation, video output 112 is an output interface circuit for providing video to the connected display(s). In one embodiment, switch 108 includes circuitry for demodulating the chosen signal to re-create the original NTSC video signal. In one embodiment, the diversity receiver will demodulate all received signal paths but discard all but the chosen signal, with the choosing of signals and determining of RSSI happening after demodulation. In another embodiment, the diversity receiver can have a circuit or processor between signal path input interfaces 102-1, 102-2, . . . 102-N and switch 108 in order to perform the demodulation. In some implementation, the diversity receiver has a processor that controls the components depicted in FIG. 2.

Figure 3:
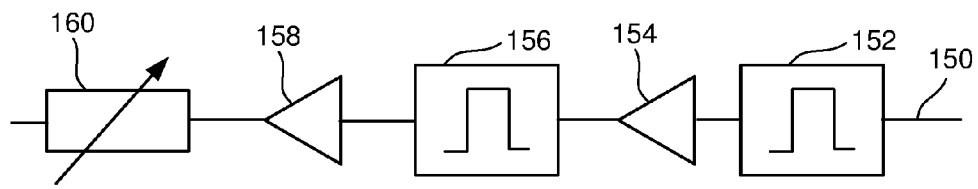
FIG. 3 is a block diagram of one example of a remote receiver front end module.

FIG. 3 is a block diagram of one embodiment of a remote receiver front end module 50, 52, 54, 56, 58, 60. In one embodiment, the remote receiver front end module comprises a combination of low noise amplifier(s) 154 and 158, optional RF filters 152 and 156 and a variable attenuator 160. The remote receiver front end module connects to the antenna and simultaneously sets the noise figure and the total gain of the receiver. Filters are used optionally to reduce out of band noise, and the optional variable attenuator can be used to control the overall gain distribution in the case where multiple modules are used in series. The signal 150 from the antenna is received at filter 152 to remove noise before sending the signal to low noise amplifier 154. The output of low noise amplifier 154 is provided to filter 156. The output of filter 156 is transmitted to low noise amplifier 158 and then to attenuator 160. The output of attenuator 160 is transmitted toward the combiners 62 or 64.

Figure 4:
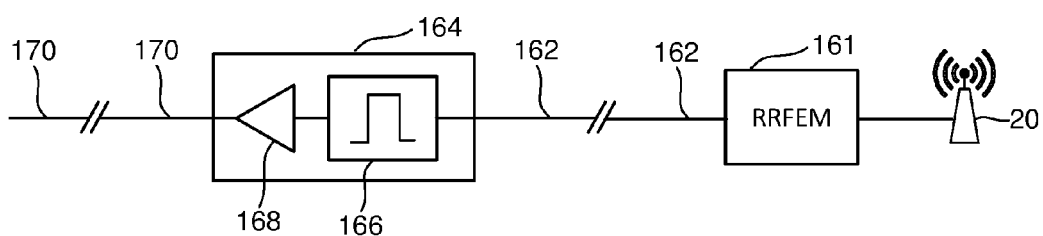
FIG. 4 is a block diagram of one example of a remote receiver front end module apparatus combined with an inline amplifier module.

In some designs, for a given length of cable between the remote receiver front end module and the combiners, whether coaxial or fiber, there is loss that should be overcome to keep the signal degradation to a minimum. One method of overcoming this loss is to use inline amplifier modules with enough gain to overcome the subsequent losses. FIG. 4 is a block diagram of a circuit for an example inline amplifier modules to be used along the cables between the remote receiver front end module and the combiners. The output of an example remote receiver front end module 161 (which can be any of 50, 52, 54, 56, 58 or 60) is transmitted along cable 162 (coax or fiber optic) for approximately 100 feet (or other amount). After approximately 100 feet (or other amount), an inline amplifier module 164 is placed and then another 100 feet of cable, and so on. In one embodiment, there will be an inline amplifier module 164 every 100 feet. One example implementation of the inline amplifier module 164 includes a filter 166 with an output connected to an input of low noise amplifier 168. Filters are used optionally to reduce out of band noise.

The use of remote receiver front end modules and inline amplifier modules remote from the diversity receivers are what makes the system a distributed receiver system. By using a distributed receiver system a significant extension of range is achievable; however the challenge lies in the combining of the signal from each antenna. Drone racing at high speeds requires very low latency throughout the system, with some pilots wanting video feedback on the order of <10 milliseconds in order to appropriately react to features of a race course. Therefore, one embodiment uses a NTSC analog video transmitter and an analog distributed video receiver.

For an analog DAS system without digital header information or pilot tones, the combination of signals and redistribution to multiple end users should be achieved in such a way that the signals from multiple paths must be isolated from each other to avoid signal degradation known as multipath interference or "ghosting" as it applies to video signals. Identical signals from two or more signal paths in the same analog network will combine constructively if they are aligned in time, however if they are slight offset in time the can combine destructively. For example, if a drone is located at an equal distance between two or more antennas, and the signal paths are combined into a single receiver, the resulting combined signal can appear distorted and in some cases will be lost completely. One remediation used in the proposed system is to utilize a diversity receiver, and placing antennas in such a manner that a) there is overlap between antenna coverage areas to provide for continuity throughout the race path without loss in coverage, and b) signals from adjacent antennas are not combined into the same signal path. The diversity receiver can then be used to automatically switch between signal paths based on RSSI as the drone traverses from one antenna area to another. Non-adjacent antennas that are spaced sufficiently apart may be combined into a common signal path as there will never be a high enough magnitude present at each antenna simultaneously due to losses in propagation to cause significant signal degradation.

Another challenge with combination in an analog distributed receiver is that the active elements, i.e. LNAs, mixers, demodulators, etc common in a receiver will create intermodulation distortion whenever more than one carrier (or subcarrier) frequency is present. This results in mixed frequency products that cause interference to other users. A common implementation of an NTSC transmitter frequency modulates video, left audio, and right audio onto separate subcarriers that are then combined before transmitting. This is further compounded when there are multiple users each transmitting multiple subcarriers, resulting in mixed frequency products that are present frequently throughout the frequency band in use. As such, and as part of this proposed system, one method of conditioning this signal is to modify the downlink signal to remove the left and right audio subcarriers, reducing the number of $3^{rd}$ order mixed products in a system by 66%.

In order to remotely locate an antenna, a remote receiver front end module apparatus is used to preserve the dynamic range of the diversity receiver, in addition to amplifier modules distributed throughout the signal path. The arrangement and quantity may be extended without limit so long as the previous antenna placement requirement are not violated and the a) total sum of the gain of the inline amplifiers remote receiver front end module, and loss of all cables and other passive elements does not limit the cascaded noise figure of the system, and b) the third order intercept of any stage in the cascaded receiver does not exceed the 1 dB compression point of any of the stages in the cascade. As such, the inline amplifier apparatus has been designed such that the gain of each inline amplifier matches the loss for each incremental section of coaxial or fiber optic cable, and each diversity receiver path has been designed with cascaded NF, P1 dB and IP3 characteristics such that the receiver front end module sets these key metrics of the receiver performance that all good receiver designs do.

Figure 5:
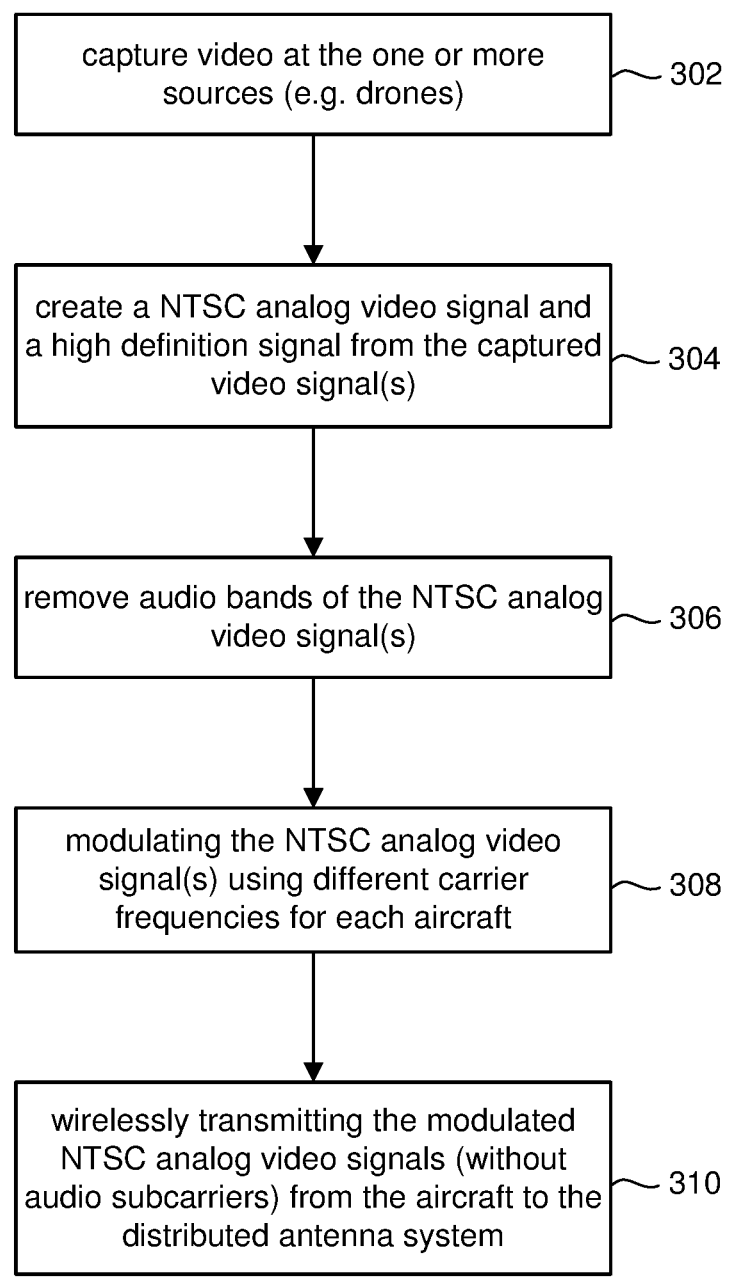
FIG. 5 is a flow chart describing one embodiment of a process for capturing video on a mobile device, such as an unmanned aircraft in a race.

FIG. 5 is a flow chart describing one embodiment of a process for capturing video on the drone 1, 2, 3, 4, 5 or other mobile device. This is the video that is transmitted to the displays 82, 84, 86, 88, 90, 92 using the system of FIG. 1. In step 302, each of the drones 1, 2, 3, 4, 5 (or other sources) captures video (standard definition or high definition). In step 304, the captured video is used to create a NTSC signal. In other embodiments, other video formats can be used. In step 306, the left and right audio subcarriers of the NTSC signal are removed. In step 308, the electronics on the drone (or other mobile source) modulates the NTSC analog video signal(s) using different carrier frequencies for each drone. The carrier frequencies are chosen to reduce or avoid nonlinear components such as intermodulation products. For example, if the system is using two drones, then their respective carriers can be set 20 MHz apart. An example set of frequencies for a system with six drones 1, 2, 3, 4, 5 (or other sources) are 5645 MHz, 5665 MHz, 5705 MHz, 5725 MHz, 5820 MHz, and 5840 MHz. In step 310, a transmitter on the drones each wirelessly transmits the modulated NTSC analog video signals (without audio subcarriers) from the aircraft to one or more antennas 10, 12, 14, 16, 18, 20. The process of FIG. 5 is performed continuously during a race or other event on multiple drones/sources.

FIG. 6 is a flow chart describing one embodiment of a process for operating the distributed antenna system of FIG. 1 in response to receiving video signals from the drones (or other sources) as per the process of FIG. 5 (or a different process). In step 350, wireless modulated analog signals are received from a first mobile source/drone (any of 1, 2, 3, 4, 5) at one or more antennas of a first set of antennas. Step 352 includes receiving the wireless modulated analog video signal from the first mobile source at one or more antennas of a second set of antennas. The second set of antennas do not include any antennas from the first set of antennas and coverage areas of the first set of antennas overlap with coverage areas of the second set of antennas, as depicted in FIG. 1. An example of the first set of antennas includes antennas 10, 14 and 18. An example of the second set of antennas includes antennas 12, 16 and 20.

Step 354 includes transmitting the received wireless modulated analog signal from the first set of antennas to a first combining and distribution network via the first signal path. Step 356 includes transmitting the received wireless modulated analog signal from the second set of antennas to a second combining and distribution network via the second signal path. An example of the first combining and distribution network includes combiner 62, splitter 66 and remote receiver front end modules 50, 54, 58. An example of the second combining and distribution network includes combiner 64, splitter 68 and remote receiver front end modules 52, 56 and 60. As depicted in FIG. 1, the second signal path is separate from and not in communication with the first signal path. Steps 354 and 356 may (optionally) utilize the circuit of FIG. 4 to transmit the signals.

Step 358 includes combining output of the first set of antennas and providing the combined output of the first set of antennas to the diversity receivers as part of the first signal path. Step 360 includes combining output of the second set of antennas and providing the combined output of the second set of antennas to the diversity receivers as part of a second signal path. In step 362, each diversity receiver 70, 72, 74, 76, 78, 80 chooses and outputs to displays 82, 84, 86, 88, 90, 92 one (or more than one—separate or combined) of the combined output of the first set of antennas and combined output of the second set of antennas based on a signal characteristic. The output video is then displayed on the connected display(s). The process of FIG. 6 is performed continuously during a race or other event for multiple drones/sources 1, 2, 3, 4, 5.

By these combinations of apparatus and methods of implementation, this proposed system sets forth a simplified version of an analog DAS system which achieves minimum latency by eliminating processing delay, allowing multiple users to coexist in a common coverage area, and is extensible to an unlimited number of remotely located antennas.

For the flight control system, a transmit and receive solution is used which employs a long range, narrowband, frequency hopping modulation scheme. This solution operates in the 868 and 915 MHz bands, which are unlicensed bands for the EU and Americas, respectively. The range of this system is extensive, however dead zones do exist depending on the environment surrounding the flight path. A unique implementation of this equipment is used to provide extended range into these areas. By combining the uplink signal (pilot to drone) from multiple users, they can then distribute the signal from all pilots to a multitude of antennas simultaneously. Using coaxial or fiber cables, the antennas can then be located remotely and additionally placed in the areas of the dead zones. In one embodiment, the signals sent to the drones are transmitted in the range of 902-928 MHz, with the ability to frequency hop among fifty channels spaced 0.5 MHz apart. The transmit signal from each pilot frequency "hops" every 5 milliseconds using a direct sequence to avoid interference with other users, and in this system each transmitter uses the same sequence based on the same seed to a pseudo random algorithm. Therefore, the system must be set up and provisioned so that each transmitter, while following the same frequency hopping sequence, is offset in time, thereby eliminating packet collisions. In other embodiments, different drones/sources can use different seeds to avoid collisions.

FIG. 7 is a block diagram of the components of the control system for sending flight control commands to the drones (or other sources). In one example, each drone 1, 2, 3, 4, 5 (not depicted in FIG. 7) has one pilot (possibly wearing a head mounted display 82, 94, 86, 88, 90 92) and each pilot has one pilot controller 402, 404, 406, 408, 410, and 412. Thus, there is one pilot controller per drone. Each pilot controller 402, 404, 406, 408, 410, and 412 is connected to its own transmitter using a digital PPM signal. For example, pilot controller 402 is connected to transmitter 420, pilot controller 404 is connected to transmitter 422, pilot controller 406 is connected to transmitter 424, pilot controller 408 connected to transmitter 426, pilot controller 410 is connected to transmitter 428 and pilot controller 412 is connected to transmitter 430. In one embodiment, each transmitter is paired to a receiver on the one respective drone prior to flight, which includes exchanging keys for the beam hopping algorithm. The transmitters use the different hopping carrier frequencies to perform FSK modulation on the control signals from the pilot controllers. The output of the transmitters 420, 422, 424, 426, 428, 430 are all connected to combiner 440, which combines the six signals into one combined signal and sends that combined signal to the connected splitter 442, which makes 6 copies of the combined signal. The combined signal is then sent from splitter 442 to a set of antennas 450, 452, 454, 456, 458 and 460 which are placed about the race course (or other environment). In one embodiment, antennas 450, 452, 454, 456, 458 and 460 are different than antennas 10, 12, 14, 16, 18, 20. In another embodiment, antennas 450, 452, 454, 456, 458 and 460 are the same as antennas 10, 12, 14, 16, 18, 20. Antennas 450, 452, 454, 456, 458 and 460 transmit the combined signal received from splitter 442 to the drones, which filter and demodulate the signals to access the signal from its paired pilot controller and executes the flight command contained therein.

One embodiment includes a communication system, comprising: a plurality of antennas including multiple disjoint sets of multiple antennas configured to receive signals from multiple mobile sources, at least a subset of the antennas have coverage areas that are adjacent with coverage areas of antennas in another set of the multiple disjoint sets of multiple antennas; multiple receivers; and multiple signal paths including one signal path for each set of multiple antennas, each signal path configured to provide outputs from a corresponding set of multiple antennas of the multiple disjoint sets of antennas to each of the multiple receivers, each of the receivers choose to output information from one or more of the signal paths.

In one embodiment, the multiple disjoint sets of multiple antennas include at least a first set of antennas and a second set of antennas configured to receive signals from the multiple mobile sources, coverage areas of the first set of antennas overlap with coverage areas of the second set of antennas; and the multiple signal paths include a first signal path connected to the first set of antennas and the receivers configured to provide outputs from the first set of antennas to each of the receivers and a second signal path connected to the second set of antennas and the receivers configured to provide outputs from the second set of antennas to each of the receivers of the plurality of receivers, each of the receivers choose to output information from the first signal path or the second signal path based on signal characteristics of the signals received from first signal path and the second signal path.

One embodiment includes a communication system, comprising: a plurality of antennas including at least a first set of antennas and a second set of antennas configured to receive signals from multiple mobile sources, coverage areas of the first set of antennas overlap with coverage areas of the second set of antennas; a plurality of receivers; a first signal path connected to the first set of antennas and the receivers, the first signal path is configured to provide outputs from the first set of antennas to each of the receivers of the plurality of receivers; and a second signal path connected to the second set of antennas and the receivers, the second signal path is configured to provide outputs from the second set of antennas to each of the receivers of the plurality of receivers, each of the receivers choose to output information from the first signal path or the second signal path based on a signal characteristic of signals received from the first signal path and the second signal path.

One example implementation further includes an aircraft control communication structure that comprises: controllers, the multiple mobile sources are unmanned aircraft and each controller operates one of the aircraft; transmitters connected to the controllers; a combiner connected to the transmitter; a splitter connected to the combiner; and a set of control antennas connected to the splitter.

One embodiment includes a method for operating a communication system, comprising: receiving a wireless modulated analog signal from a first mobile source at one or more antennas of a first set of antennas; receiving the wireless modulated analog signal from the first mobile source at one or more antennas of a second set of antennas, the second set of antennas do not include any antennas from the first set of antennas, coverage areas of the first set of antennas overlap with coverage areas of the second set of antennas; combining output of the first set of antennas and providing the combined output of the first set of antennas as part of a first signal path; combining output of the second set of antennas and providing the combined output of the second set of antennas as part of a second signal path that is separate from and not in communication with the first signal path; and choosing and outputting one of the combined output of the first set of antennas and combined output of the second set of antennas based a signal characteristic.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

The invention claimed is:

1. A communication system, comprising:
a plurality of antennas including multiple disjoint sets of multiple antennas configured to receive signals from multiple mobile sources, at least a subset of the antennas have coverage areas that are adjacent with coverage areas of antennas in another set of the multiple disjoint sets of multiple antennas;
multiple receivers; and
multiple separate signal paths including one signal path for each set of multiple antennas, each signal path configured to provide outputs from a corresponding set of multiple antennas of the multiple disjoint sets of antennas to each of the multiple receivers at the same time, each of the receivers choose to output information from one or more of the signal paths.

2. The system of claim 1, wherein:
adjacent antennas are in different disjoint sets of antennas.

3. The system of claim 1, wherein:
each of the receivers configured to choose to output information from one of the signal paths based on a characteristic of signals received from the signal paths.

4. The system of claim 1, wherein:
each signal path of the multiple signal paths includes a combiner that combines output signals from the corresponding set of multiple antennas of the multiple disjoint sets of multiple antennas to form a combined signal; and
each signal path of the multiple signal paths includes a splitter configured to transmit the combined signal to each of the receivers of the multiple receivers.

5. The system of claim 1, wherein:
each signal path comprises a combining and distribution network that combines output signals from multiple antennas of a respective set of antennas to form a combined signal and transmits the combined signal to each of the receivers of the multiple receivers.

6. The system of claim 1, wherein:
each signal path comprises a separate combiner that is configured to combine output signals from multiple antennas of a respective set of antennas to form a combined signal, the combined signal is transmitted to each of the receivers of the multiple receivers.

7. A communication system, comprising:
a plurality of antennas including at least a first set of antennas and a second set of antennas configured to receive signals from multiple mobile sources, coverage areas of the first set of antennas overlap with coverage areas of the second set of antennas;
a plurality of receivers;
a first signal path connected to the first set of antennas and the receivers, the first signal path is configured to provide outputs from the first set of antennas to each of the receivers of the plurality of receivers, the first signal path comprises a first combining and distribution network that combines output signals from multiple antennas of the first set of antennas to form a first combined signal and transmits the first combined signal to each of the receivers of the plurality of receivers; and
a second signal path connected to the second set of antennas and the receivers, the second signal path is configured to provide outputs from the second set of antennas to each of the receivers of the plurality of receivers, each of the receivers choose to output information from the first signal path or the second signal path based on a signal characteristic of signals received from the first signal path and the second signal path, the second signal path comprises a second combining and distribution network that combines output signals from multiple antennas of the second set of antennas to form a second combined signal and transmits the second combined signal to each of the receivers of the plurality of receivers.

8. The system of claim 7, wherein:
adjacent antennas are in different disjoint sets of antennas.

9. The system of claim 7, wherein:
each of the receivers choose to output information from the first signal path or the second signal path for one of the mobile sources based on signal characteristics of signals received from the first signal path or the second signal path.

10. The system of claim 7, wherein:
the first signal path further comprises transmission line, amplifiers and filters; and
the second signal path further comprises transmission line, amplifiers and filters.

11. The system of claim 7, wherein:
the first signal path comprises a splitter configured to transmit the first combined signal to each of the receivers of the plurality of receivers;
the second signal path comprises a splitter configured to transmit the second combined signal to each of the receivers of the plurality of receivers; and
each of the receivers operate on the first combined signal and the second combined signal to identify a first signal from a particular one of the mobile sources from the first combined signal and a second signal from the particular one of the mobile sources from the second combined signal and choose to output the first signal or the second signal.

12. The system of claim 7, wherein:
each of the receivers choose to output information from the first signal path or the second signal path based on strength of the signals received from first signal path and the second signal path.

13. The system of claim 7, further comprising an aircraft control communication structure that comprises:
controllers, the multiple mobile sources are unmanned aircraft and each controller operates one of the aircraft;
transmitters connected to the controllers;
a combiner connected to the transmitter;
a splitter connected to the combiner; and
a set of control antennas connected to the splitter.

14. The system of claim 13, wherein:
the transmitters perform modulation and frequency hopping; and
the unmanned aircraft are racing.

15. A communication system, comprising:
a plurality of antennas including at least a first set of antennas and a second set of antennas configured to receive signals from multiple mobile sources, coverage areas of the first set of antennas overlap with coverage areas of the second set of antennas, the plurality of antennas configured to receive modulated analog video signals from the multiple mobile sources, the multiple mobile sources are unmanned aircraft that transmit on different carrier frequencies during a race of the unmanned aircraft;
a plurality of receivers;
a first signal path connected to the first set of antennas and the receivers, the first signal path is configured to provide outputs from the first set of antennas to each of the receivers of the plurality of receivers; and
a second signal path connected to the second set of antennas and the receivers, the second signal path is configured to provide outputs from the second set of antennas to each of the receivers of the plurality of receivers, each of the receivers configured to choose to output information from the first signal path or the second signal path based on a signal characteristic of signals received from the first signal path and the second signal path.

16. The system of claim 15, wherein:
each of the receivers configured to choose to output information from the first signal path or the second signal path based on video clarity of signals received from first signal path and the second signal path.

17. A method for operating a communication system, comprising:
receiving a wireless modulated analog signal from a first mobile source at one or more antennas of a first set of antennas;
receiving the wireless modulated analog signal from the first mobile source at one or more antennas of a second set of antennas, the second set of antennas do not include any antennas from the first set of antennas, coverage areas of the first set of antennas overlap with coverage areas of the second set of antennas;
combining output of the first set of antennas and providing the combined output of the first set of antennas as part of a first signal path;
combining output of the second set of antennas and providing the combined output of the second set of antennas as part of a second signal path that is separate from and not in communication with the first signal path;
transmitting the received wireless modulated analog signal from the first set of antennas to a first combining and distribution network via the first signal path, the combining output of the first set of antennas and providing the combined output of the first set of antennas is performed by the first combining and distribution network;
transmitting the received wireless modulated analog signal from the second set of antennas to a second combining and distribution network via the second signal path, the combining output of the second set of antennas and providing the combined output of the second set of antennas is performed by the second combining and distribution network; and
choosing and outputting one of the combined output of the first set of antennas and combined output of the second set of antennas based on a signal characteristic, the choosing and outputting is performed by a receiver that receives the provided combined output of the first set of antennas from the first combining and distribution network and the provided combined output of the second set of antennas from the second combining and distribution network.

18. The method of claim 17, wherein:
adjacent antennas are in different sets of the first set of antennas and the second set of antennas.

19. The method of claim 17, further comprising:
capturing video at the first mobile source, the first mobile source is an unmanned aircraft;
creating a NTSC analog video signal;
removing audio bands of the NTSC analog video signal;
modulating the NTSC analog video signal; and
wirelessly transmitting the modulated NTSC analog video signal without audio subcarriers from the aircraft during a race of the aircraft.

* * * * *